Figure 1:
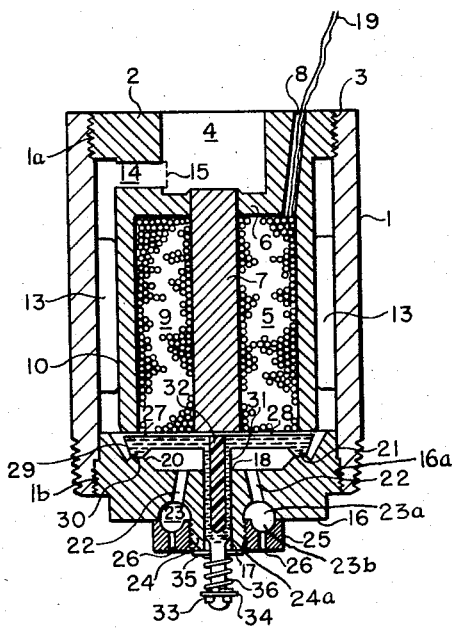

Oct. 27, 1959     W. F. GUNKEL     2,910,249

SOLENOID ACTUATED VALVE FOR CONTROLLING FLOW TO A NOZZLE

Filed March 19, 1958

INVENTOR
WILLIAM F. GUNKEL

BY
*Killman and Kerst*
ATTORNEYS

United States Patent Office 2,910,249
Patented Oct. 27, 1959

2,910,249

SOLENOID ACTUATED VALVE FOR CONTROLLING FLOW TO A NOZZLE

William F. Gunkel, Baltimore, Md., assignor to Bendix Aviation Corporation, Towson, Md., a corporation of Delaware Application March 19, 1958, Serial No. 722,503

2 Claims. (Cl. 239—548)

This invention relates to valves of the solenoid actuated type in which fluid is passed through the body of the valve around the solenoid winding.

It is an object of the invention to provide a valve of the above type which is simple and inexpensive to manufacture.

It is another object of the invention to provide such a valve with those of its parts which are subject to failure and the necessity of renewal positioned exteriorly of the valve where they are accessible for easy renewal.

These and other objects and advantages of the invention are realized in a valve comprising a tubular housing member, a cylindrical member closing into one end of the housing member and extending inwardly thereof, the cylindrical member containing the solenoid and its core and being provided with passage for the flow of fluid therethrough, a disc-shaped seat member closing the other end of said housing member and having an annular valve seat formed on its inner end surrounding a plurality of fluid ports and having a central neck on its outer end, an annular nozzle member threadedly received on said neck and containing nozzle openings matching said ports, a valve member positioned between said seat and the inner end of said solenoid, said valve member having a central stem passing through a central bore in said neck and protruding therefrom, and a spring surrounding said protruding portion and urging said valve against said seat.

Figure 2:
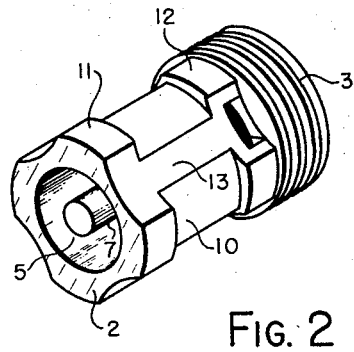

In the drawings:

Fig. 1 is an elevational view, in cross-section, of a valve assembly embodying the invention; and, Fig. 2 is an elevational view, in perspective, of the cylindrical solenoid containing member of the valve of Fig. 1.

Referring more particularly to the drawing, there is shown a tubular member 1, forming the lateral walls of the casing of the valve. The ends are internally threaded as shown at 1a and 1b. This member may be tubing of stock size. Received within the shell 1 is a cylindrical member 2 shown in both Figs. 1 and 2. The upper end of this member, as shown in Fig. 1, is threaded and of a size to thread into the threaded end of the shell as shown at 3. A bore 4 is formed in this end coaxially of the member and a similar, but larger, bore 5 is formed in the other end, the two bores being separated by a septum 6.

Secured in this septum, in a fluid tight manner, is a core member 7 of cylindrical shape. The member 7 extends coaxially of the valve and terminates at its free end flush with the end of the member 2.

The member 2 acts as a coil can to house the solenoid coil 9 which is wound about the core member 7. A passageway 8 leads from the bottom of the bore 5 through the threaded end of the coil can 2 to accommodate the leads 19 of the solenoid.

The central portion of the coil can 2 is of reduced diameter as shown at 10. This leaves a pair of shouldered portions 11 and 12 at its ends. Four equally spaced longitudinally extending arcuate concavities 13 are formed in the member 2, extending through both shouldered portions 11 and 12. This construction affords four passageways extending from the threaded portion of the member 2 to the opposite end when the member is in place in the shell 1. These passages are shown in Fig. 1. At least one laterally extending passageway 14 is formed in the member 2 extending between the bore 4 and one of the passageways 13. The intake end of this passageway may be screened as at 15.

Received in the opposite end of the shell 1 is a valve seat member 16 which has the form of a disc with its periphery threaded over a portion of its length as shown at 16a and being received in the correspondingly threaded portion 1b of the shell 1. The member 16 is formed with an axially extending bore 17 and its inner end is provided with a concavity 18 having an annular raised portion 20, the upper surface of which is in the form of a flat ring 21 which acts as the valve seat. Extending through the disc 16 are a pair of passageways or ports 22. The outer ends of these ports terminate in an annular concavity 23a formed in the outer surface of the disc 16.

Extending from the central portion of the disc 16 and surrounding the bore 17 is a neck portion 24 having its outer periphery threaded as indicated at 24a. Threadedly received on the neck portion 24 is a nozzle member 25 having a pair of nozzle orifices 26 extending from the outer end thereof to an annular concavity 23b formed in the inner end of the member 24 and mating with the annular concavity of the disc 16 to form an annular chamber 23.

A valve member 27 is provided having an upper disc-like portion 28 formed on its lower surface with an annular boss 29, terminating in a flat annular surface 30 of plane configuration which mates with the valve seat 21. Depending from the disc 28 is a stem portion 31 which has its central portion hollowed out and filled with a light weight material as indicated at 32. The lower end of the stem 31 is of reduced diameter and extends outside the end of the neck portion 24 of the disc 16. The outer end of the protruding portion of the stem 31 is grooved to receive a C washer 33 which acts as a stop for a washer 34. Another washer 35 surrounds the stem and lies against the outer end of the neck portion 24. A spring 36 is positioned around the stem 31 between the two washers 34 and 35.

The shell member 1 may be of steel or other suitable metallic material. The coil can 2 is preferably a casting of soft magnetic iron. The coil core 7 may be a stock rod of soft magnetic iron. The disc 16 may be made of stainless steel or other non-magnetic material. The valve member 29 may be made of soft magnetic iron. Any suitable material may be used for the nozzle member 25.

In the operation of the above described valve fluid under pressure is supplied to the bore 4. It flows through the passageway 14 and fills the passageways 13 and the space above the disc portion 28 of the valve member 27. The valve is maintained in its seated position by the spring 36. Upon energization of the solenoid the valve is lifted off its seat traveling the short distance which is shown in Fig. 1 to exist between the upper surface of the disc portion 28 and the lower end of the coil can 2. The annular space 23 acts as a turbulence smoothing chamber.

The above described valve is simple and inexpensive to manufacture, being formed in large part from stock shapes and castings and requiring a minimum of machining operations. During the manufacture, the upper surface of the disc 28 and the upper surface of the disc 16 may be machined in one operation by positioning a spacing washer of a thickness which equals the desired opening distance between the surfaces 21 and 30.

Another feature of this construction lies in the fact that the parts of the valve which are most subject to service caused defects, which are the spring 36 and the nozzle member 25, are exteriorly placed on the valve structure so that they may be replaced without the necessity of disassembling the valve.

What is claimed is:

1. A valve mechanism comprising a tubular shell, a cylindrical, hollow can fixedly mounted in said shell, open at one end and closed at the other end, said closed end being rigidly connected in a fluid tight manner within one end of said shell, a solenoid rigidly mounted in said can, said can having a fluid passageway formed throughout its length, a disc secured within the other end of said shell and closing the same in a fluid tight manner, said disc having its inner end formed with a concavity, adjacent the exposed end of said solenoid, and having its outer end formed with a coaxially extending neck, said disc and said neck having a coaxial bore extending therethrough and said disc having a plurality of fluid ports extending therethrough, a valve seat formed in said concavity, a valve member having a disc-like shape with a stem protruding from the center thereof, said stem extending through said bore and protruding therefrom, said valve member having a surface mating with said valve seat in a fluid tight manner when said valve member is in its outermost position, a spring surrounding said stem and urging said valve member to its seat engaging position, and a nozzle member threadedly received on said neck in fluid tight contact with the outer surface of said disc, said nozzle member having a nozzle orifice in communicating relationship with each of said ports of said disc.

2. A valve mechanism comprising a tubular shell, a hollow cup-shaped container rigidly mounted in said shell closing one end of said shell in a fluid tight manner, a solenoid rigidly mounted in said container with one end thereof exposed, said container having a fluid passageway extending throughout its length, a disc secured within the other end of said shell and closing the same in a fluid tight manner, said disc having its inner end formed with a concavity, adjacent the exposed end of said solenoid, and having its outer end formed with a coaxially extending neck, said disc and said neck having a coaxial bore extending therethrough and said disc having a plurality of fluid ports extending therethrough, a valve seat formed in said concavity, a valve member having a disc-like shape with a stem protruding from the center thereof, said stem extending through said bore and protruding therefrom, said valve member having a surface mating with said valve seat in a fluid tight manner when said valve member is in its outermost position, a spring surrounding said stem and urging said valve member to its seat engaging position, and a nozzle member threadedly received on said neck in fluid tight contact with the outer surface of said disc, said nozzle member having a nozzle orifice in communicating relationship with each of said ports of said disc.

References Cited in the file of this patent

UNITED STATES PATENTS

| 1,664,616 | French | Apr. 3, 1928 |
| 1,758,105 | French | May 13, 1930 |
| 2,289,456 | Ray | July 14, 1942 |
| 2,783,021 | Bickley | Feb. 26, 1957 |